US012449762B2

(12) United States Patent
Xu et al.

(10) Patent No.: US 12,449,762 B2
(45) Date of Patent: Oct. 21, 2025

(54) IMAGE FORMING APPARATUS HAVING DRUM CARTRIDGE, TONER CARTRIDGE AND MEMORY WITH STORED INFORMATION TO DETERMINE DRUM ROTATION CONTINUATION OPERATION

(71) Applicant: BROTHER KOGYO KABUSHIKI KAISHA, Nagoya (JP)

(72) Inventors: Fan Xu, Nagoya (JP); Koji Ogawa, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/656,191

(22) Filed: May 6, 2024

(65) Prior Publication Data

US 2024/0419113 A1 Dec. 19, 2024

(30) Foreign Application Priority Data

Jun. 16, 2023 (JP) ................................ 2023-099519

(51) Int. Cl.
*G03G 15/08* (2006.01)
*G03G 15/00* (2006.01)
*G03G 21/18* (2006.01)

(52) U.S. Cl.
CPC ..... *G03G 21/1875* (2013.01); *G03G 15/0863* (2013.01); *G03G 15/5008* (2013.01);
(Continued)

(58) Field of Classification Search
CPC ............. G03G 15/0863; G03G 15/556; G03G 15/5008; G03G 21/1889; G03G 21/203;
(Continued)

(56) References Cited

U.S. PATENT DOCUMENTS 5,008,711 A 4/1991 Sakamoto et al.
6,219,505 B1 4/2001 Sato et al.
(Continued)

FOREIGN PATENT DOCUMENTS

JP H01-26865 B2 5/1989
JP H09-62161 A 3/1997
(Continued)

*Primary Examiner* — Robert B Beatty
(74) *Attorney, Agent, or Firm* — Merchant & Gould P.C.

(57) ABSTRACT

A memory of an image forming apparatus is configured to store drum cartridge information and toner cartridge information. The drum cartridge information includes at least a number of drum printed sheets or a number of drum rotations. The toner cartridge information includes at least a number of toner printed sheets, a number of development rotations, or a toner dot count. A controller updates the drum cartridge information and the toner cartridge information stored in the memory in association with execution of image formation. The controller performs a rotation continuation operation of continuing rotations of a photosensitive drum and a development roller until a rotation continuation time elapses after a last sheet in a print job passes the photosensitive drum. The rotation continuation time is determined based on the drum cartridge information and the toner cartridge information.

19 Claims, 9 Drawing Sheets

ROTATION CONTINUATION TIME TC=T1+T2+T3+T4

| SPECIFICATION OF DRUM CARTRIDGE | A | B | C | D |
|---|---|---|---|---|
| T1 | 0 SEC | 0.1 SEC | 0.2 SEC | 0.3 SEC |

| NUMBER OF DRUM PRINTED SHEETS | 0 TO 2000 SHEETS | 2001 TO 4000 SHEETS | 4001 TO 6000 SHEETS | 6001 SHEETS OR MORE |
|---|---|---|---|---|
| T2 | 0 SEC | 0.5 SEC | 1 SEC | 1.5 SEC |

| SPECIFICATION OF TONER CARTRIDGE | A | B | C | D |
|---|---|---|---|---|
| T3 | 0 SEC | 0.2 SEC | 0.4 SEC | 0.6 SEC |

| NUMBER OF TONER PRINTED SHEETS | 0 TO 1000 SHEETS | 1001 TO 2000 SHEETS | 2001 TO 3000 SHEETS | 3001 SHEETS OR MORE |
|---|---|---|---|---|
| T4 | 0 SEC | 1.4 SEC | 2.8 SEC | 4.2 SEC |

(52) U.S. Cl.
CPC ....... *G03G 15/556* (2013.01); *G03G 21/1878* (2013.01); *G03G 2215/0695* (2013.01); *G03G 2215/0697* (2013.01); *G03G 2221/1823* (2013.01)

(58) Field of Classification Search
CPC ........... G03G 21/0064; G03G 21/1817; G03G 21/1875; G03G 21/1878; G03G 2215/0695; G03G 2215/0697; G03G 2221/1823
USPC .......................... 399/24, 26, 27, 71, 111, 113
See application file for complete search history.

(56) References Cited

U.S. PATENT DOCUMENTS

| | | | | |
|---|---|---|---|---|
| 6,363,226 | B1 * | 3/2002 | Batori | G03G 21/1889 399/12 |
| 2001/0004423 | A1 | 6/2001 | Kakeshita et al. | |
| 2013/0230331 | A1 * | 9/2013 | Takahashi | G03G 15/5041 399/24 |
| 2013/0272726 | A1 * | 10/2013 | Sunahara | G03G 15/086 399/25 |
| 2019/0227476 | A1 * | 7/2019 | Hayashi | G03G 21/0094 |
| 2020/0310344 | A1 * | 10/2020 | Yoshimoto | G03G 15/0863 |

FOREIGN PATENT DOCUMENTS

| | | | |
|---|---|---|---|
| JP | 2000-267537 | A | 9/2000 |
| JP | 2001-175133 | A | 6/2001 |
| JP | 2002-72785 | A | 3/2002 |
| JP | 2006-17920 | A | 1/2006 |
| JP | 2007-199258 | A | 8/2007 |
| JP | 2007-271871 | A | 10/2007 |
| JP | 2010-156746 | A | 7/2010 |
| JP | 2020-46510 | A | 3/2020 |
| JP | 2022-93103 | A | 6/2022 |

* cited by examiner

FIG. 7

ROTATION CONTINUATION TIME TC = T1 + T2 + T3 + T4

| SPECIFICATION OF DRUM CARTRIDGE | A | B | C | D |
|---|---|---|---|---|
| T1 | 0 SEC | 0.1 SEC | 0.2 SEC | 0.3 SEC |

| NUMBER OF DRUM PRINTED SHEETS | 0 TO 2000 SHEETS | 2001 TO 4000 SHEETS | 4001 TO 6000 SHEETS | 6001 SHEETS OR MORE |
|---|---|---|---|---|
| T2 | 0 SEC | 0.5 SEC | 1 SEC | 1.5 SEC |

| SPECIFICATION OF TONER CARTRIDGE | A | B | C | D |
|---|---|---|---|---|
| T3 | 0 SEC | 0.2 SEC | 0.4 SEC | 0.6 SEC |

| NUMBER OF TONER PRINTED SHEETS | 0 TO 1000 SHEETS | 1001 TO 2000 SHEETS | 2001 TO 3000 SHEETS | 3001 SHEETS OR MORE |
|---|---|---|---|---|
| T4 | 0 SEC | 1.4 SEC | 2.8 SEC | 4.2 SEC |

FIG. 11A

| NUMBER OF DRUM ROTATIONS | 0 TO 4000 TIMES | 4001 TO 8000 TIMES | 8001 TO 12000 TIMES | 12001 TIMES OR MORE |
|---|---|---|---|---|
| T2 | 0 SEC | 0.5 SEC | 1 SEC | 1.5 SEC |

| NUMBER OF DEVELOPMENT ROTATIONS | 0 TO 2000 TIMES | 2001 TO 4000 TIMES | 4001 TO 6000 TIMES | 6001 TIMES OR MORE |
|---|---|---|---|---|
| T4 | 0 SEC | 1.4 SEC | 2.8 SEC | 4.2 SEC |

FIG. 11B

| TONER DOT COUNT | 0 TO 20 MILLION DOTS | 20 TO 40 MILLION DOTS | 40 TO 60 MILLION DOTS | 80 MILLION DOTS OR MORE |
|---|---|---|---|---|
| T4 | 0 SEC | 1.4 SEC | 2.8 SEC | 4.2 SEC |

IMAGE FORMING APPARATUS HAVING DRUM CARTRIDGE, TONER CARTRIDGE AND MEMORY WITH STORED INFORMATION TO DETERMINE DRUM ROTATION CONTINUATION OPERATION

REFERENCE TO RELATED APPLICATIONS

This application claims priority from Japanese Patent Application No. 2023-099519 filed on Jun. 16, 2023. The entire content of the priority application is incorporated herein by reference.

BACKGROUND ART

An image forming apparatus including a drum cartridge and a toner cartridge is known.

SUMMARY

For example, a drum cartridge and a development cartridge are attached to and detached from a main casing. The drum cartridge is provided with a paper dust removing member for removing paper dust adhering to a photosensitive drum.

When image formation is performed by an image forming apparatus, foreign matter such as toner or paper dust may adhere to the photosensitive drum. The state of adhesion of foreign matter adhering to the photosensitive drum changes in accordance with a use state of a drum cartridge and a toner cartridge. However, in a conventional image forming apparatus, the foreign matter on the photosensitive drum is not removed in accordance with the use state of the drum cartridge and the toner cartridge.

In view of the foregoing, an example of an object of this disclosure is to remove foreign matter on a photosensitive drum in accordance with a use state of a drum cartridge and a toner cartridge.

According to one aspect, this specification discloses an image forming apparatus. The image forming apparatus includes a drum cartridge, a toner cartridge, a development roller, a memory, and a controller. The drum cartridge includes a photosensitive drum having a circumferential surface. The toner cartridge includes a toner housing configured to contain toner. The development roller is configured to contact the circumferential surface of the photosensitive drum. The development roller is configured to supply toner contained in the toner housing to the photosensitive drum and to remove foreign matter on the photosensitive drum. The memory is configured to store drum cartridge information and toner cartridge information. The drum cartridge information includes at least a number of drum printed sheets or a number of drum rotations. The number of drum printed sheets is a cumulative number of printed sheets that are printed by using the drum cartridge. The number of drum rotations is a cumulative number of rotations of the photosensitive drum. The toner cartridge information includes at least a number of toner printed sheets, a number of development rotations, or a toner dot count. The number of toner printed sheets is a cumulative number of printed sheets that are printed by using the toner cartridge. The number of development rotations is a cumulative number of rotations of the development roller. The toner dot count is a cumulative number of dots that are printed by using the toner cartridge. The controller is configured to update the drum cartridge information and the toner cartridge information stored in the memory in association with execution of image formation. Thus, the image forming apparatus updates the drum cartridge information and the toner cartridge information. The controller is configured to perform a rotation continuation operation of continuing rotations of the photosensitive drum and the development roller until a rotation continuation time elapses after a last sheet on which image formation is to be performed in a print job passes the photosensitive drum. The rotation continuation time is determined based on the drum cartridge information and the toner cartridge information. Thus, the image forming apparatus performs the rotation continuation operation of continuing rotations of the photosensitive drum and the development roller.

According to the image forming apparatus of the present disclosure, foreign matter on the photosensitive drum is appropriately removed in accordance with the use of the drum cartridge and the toner cartridge.

BRIEF DESCRIPTION OF DRAWINGS

FIG. 7 is an example of tables for calculating a rotation continuation time.

FIGS. 11A and 11B are examples of tables for calculating a rotation continuation time.

DESCRIPTION

Figure 1:
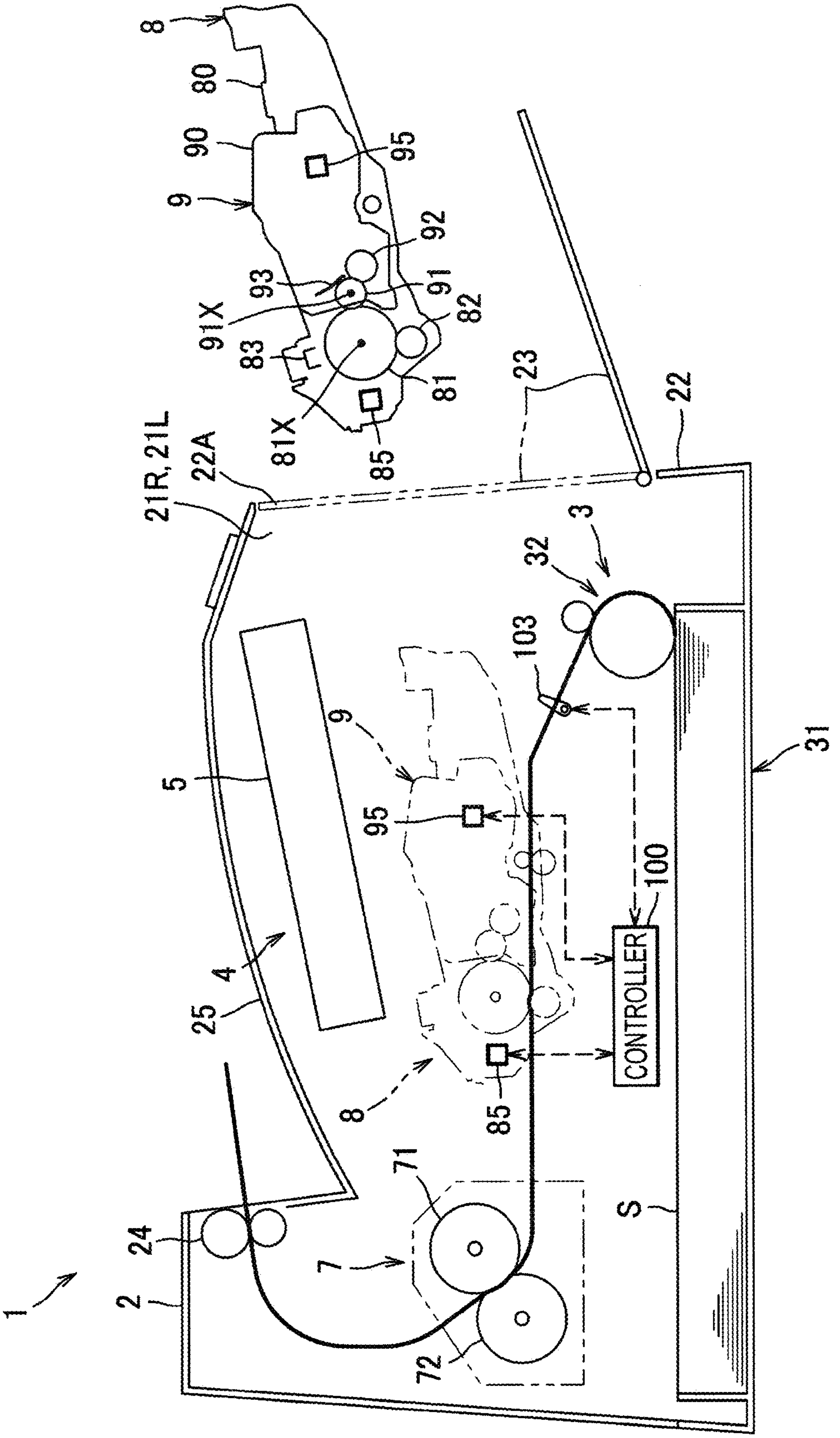
FIG. 1 is a cross-sectional view of an image forming apparatus.

An embodiment of the present disclosure will be described in detail with reference to the drawings as appropriate. As shown in FIG. 1, an image forming apparatus 1 is a monochrome laser printer. The image forming apparatus 1 includes an apparatus main body 2, a feeder unit 3, an image forming unit (print engine) 4, a controller 100, and a drum memory 85 and a toner memory 95 as an example of a memory.

The apparatus main body 2 has a shape of a hollow case. The apparatus main body 2 includes side walls 21R and 21L, and a front wall 22 connecting the side walls 21R and 21L. The front wall 22 has a main body opening 22A. The front wall 22 is provided with a front cover 23 for opening and closing the main body opening 22A.

The feeder unit 3 includes a supply tray 31 and a supply mechanism 32. The supply tray 31 is detachably attached to a lower portion of the apparatus main body 2. The supply mechanism 32 feeds a sheet S in the supply tray 31 toward the image forming unit 4.

The image forming unit 4 includes a scanner unit 5, a fuser 7, a drum cartridge 8, and a toner cartridge 9.

The scanner unit 5 is provided in an upper portion of the apparatus main body 2, and includes a laser emitting portion, a polygon mirror, a lens, a reflecting mirror, and so on, which are not shown. The scanner unit 5 irradiates a laser beam onto a surface of a photosensitive drum 81 described later by high-speed scanning.

The drum cartridge 8 is disposed between the feeder unit 3 and the scanner unit 5. The drum cartridge 8 is attachable to and detachable from the apparatus main body 2. Specifically, the drum cartridge 8 is attachable to and detachable from the apparatus main body 2 through the main body opening 22A which is opened and closed by a front cover 23 of the apparatus main body 2.

Figure 2:
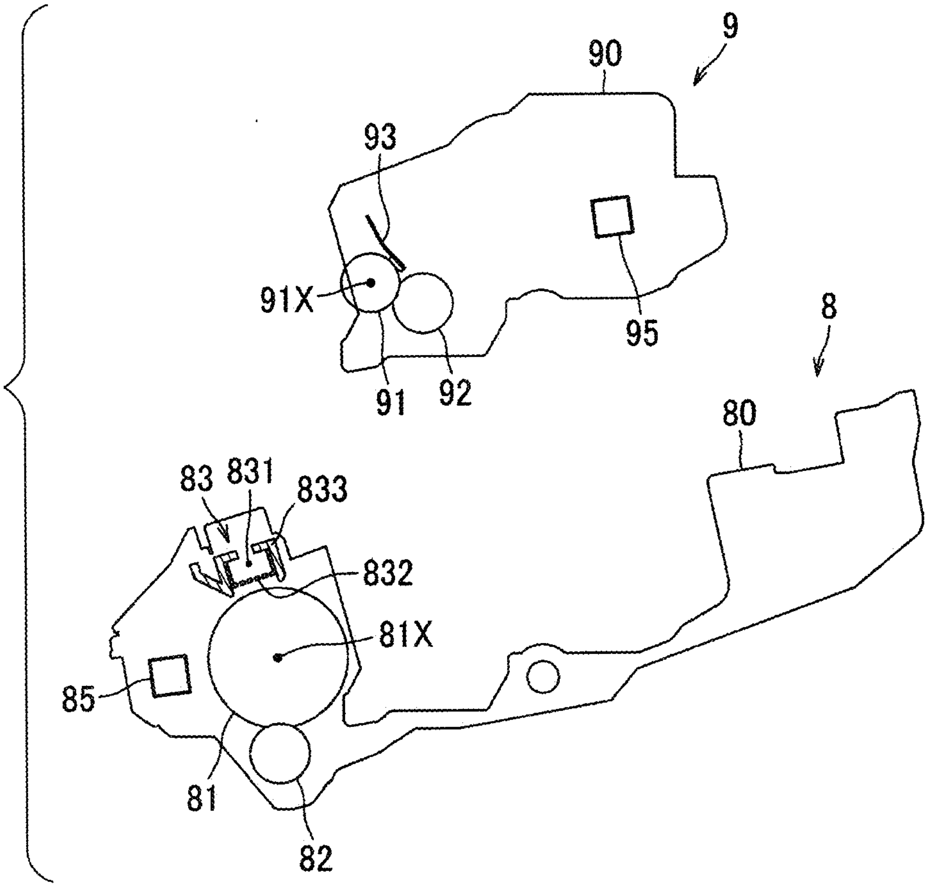
FIG. 2 is a cross-sectional view showing a drum cartridge and a toner cartridge.

The drum cartridge 8 is used together with the toner cartridge 9. In the present embodiment, as shown in FIG. 2, the toner cartridge 9 is attachable to and detachable from the drum cartridge 8. The toner cartridge 9 is attachable to and detachable from the apparatus main body 2 in a state where the toner cartridge 9 is attached to the drum cartridge 8.

The drum cartridge 8 includes a drum frame 80, the photosensitive drum 81, a transfer roller 82, a charger 83, and the drum memory 85.

The toner cartridge 9 is attachable to the drum frame 80. The drum frame 80 rotatably supports the photosensitive drum 81 and the transfer roller 82. The photosensitive drum 81 is rotatable about a first axis 81X extending in an axial direction of the photosensitive drum 81 (hereinafter, simply referred to as "axial direction"). The transfer roller 82 is arranged to face the photosensitive drum 81. The transfer roller 82 transfers a toner image formed on the photosensitive drum 81 to the sheet S between the transfer roller 82 and the photosensitive drum 81.

The charger 83 is arranged to face the photosensitive drum 81. The charger 83 includes a charging wire 831, a grid electrode 832, and a charging frame 833. The charger 83 generates corona discharge by applying a wire voltage to the charging wire 831, and charges the surface of the photosensitive drum 81.

The charging wire 831 extends along the axial direction. The grid electrode 832 is an electrode located between the charging wire 831 and the photosensitive drum 81. The charging frame 833 is a frame that covers the charger 83. The charging frame 833 supports the charging wire 831 and the grid electrode 832.

Figure 4:
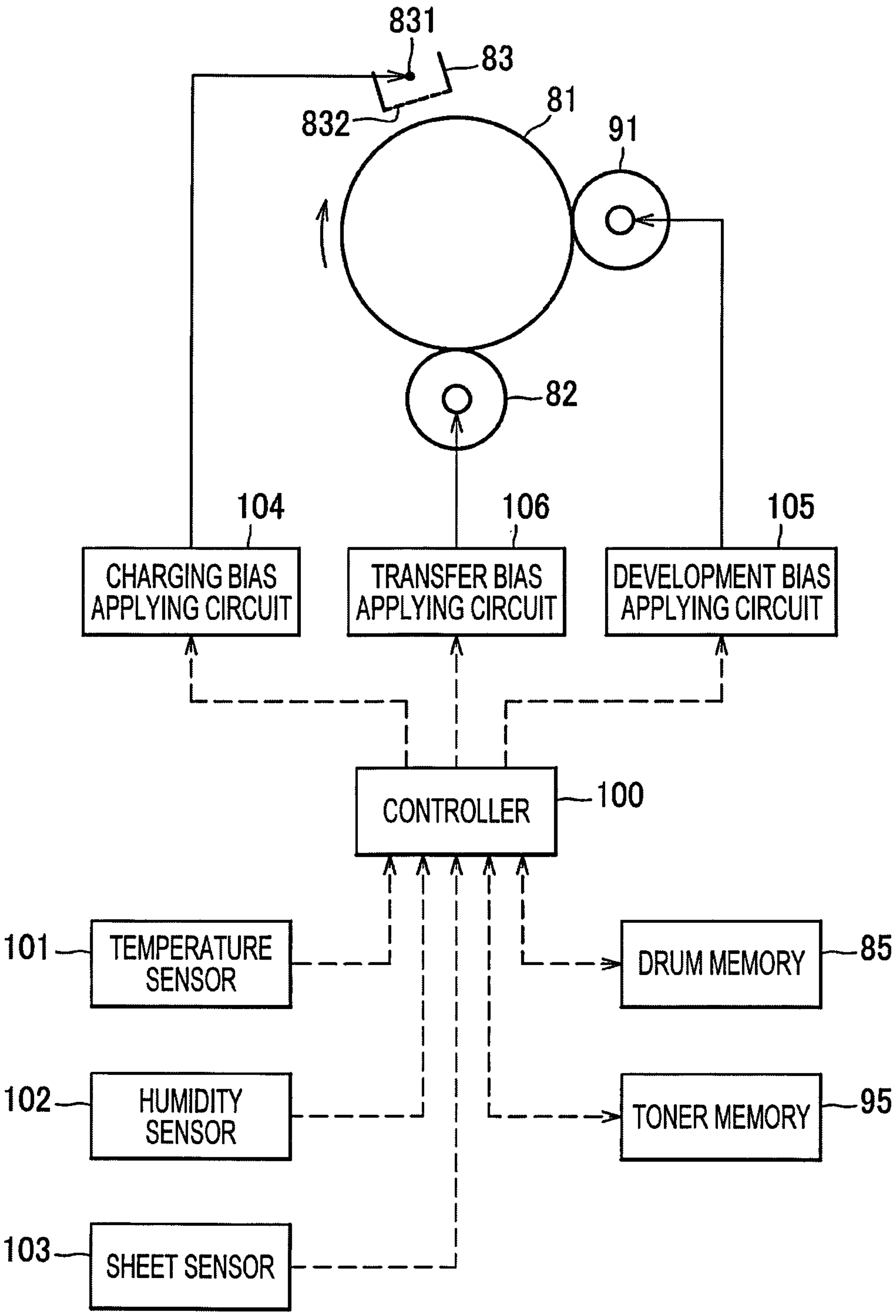
FIG. 4 is a diagram showing electrical connections between sensors, memories, applying circuits, and a controller.

The drum memory 85 constitutes a part of a memory and stores drum cartridge information. That is, the drum cartridge 8 includes the drum memory 85 as the memory for storing the drum cartridge information. The drum memory 85 is, for example, an IC chip. As shown in FIG. 4, in a state where the drum cartridge 8 is attached to the apparatus main body 2, the controller 100 is electrically connected to the drum memory 85.

Figure 3:
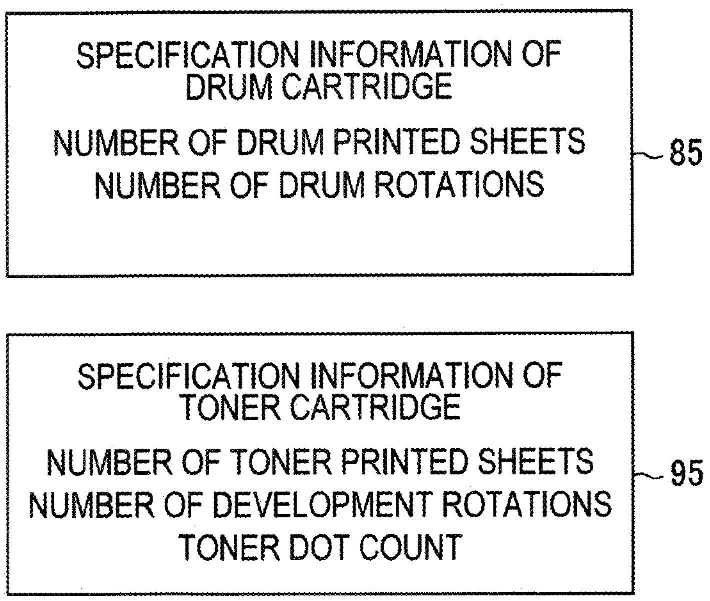
FIG. 3 is a diagram showing information stored in a drum memory and a toner memory.

As shown in FIG. 3, the drum cartridge information stored in the drum memory 85 includes at least a number of drum printed sheets or a number of drum rotations which is a cumulative number of rotations of the photosensitive drum 81. In the present embodiment, the drum memory 85 stores specification information of the drum cartridge, the number of drum printed sheets, and the number of drum rotations.

For example, the specification information of the drum cartridge 8 is information relating to the specifications of the drum cartridge 8, such as a manufacturer and life information. In the present embodiment, the specification information of the drum cartridge 8 is a serial number of the drum cartridge 8. The manufacturer and the life information as to whether the drum cartridge 8 is of a standard life type or a long life type are specified from the serial number. The number of drum printed sheets is a cumulative number of printed sheets that have been printed by using the drum cartridge 8. The number of drum rotations is a cumulative number of rotations of the photosensitive drum 81.

Returning to FIG. 2, the toner cartridge 9 includes a toner housing 90, a development roller 91, a supply roller 92, a blade 93, and the toner memory 95.

The toner housing 90 is configured to contain toner therein. The development roller 91 supplies toner to the photosensitive drum 81.

The development roller 91 rotates about a second axis 91X extending in the axial direction. As shown in FIG. 1, the development roller 91 contacts the circumferential surface of the photosensitive drum 81. The development roller 91 supplies the toner contained in the toner housing 90 to the photosensitive drum 81. The development roller 91 is configured to remove foreign matter on the photosensitive drum 81. Specifically, the development roller 91 rotates in contact with the photosensitive drum 81, and thereby rubs off foreign matter such as paper dust and residual toner by friction, and collects the foreign matter in the toner housing 90.

The supply roller 92 supplies the toner in the toner housing 90 to the development roller 91. The blade 93 regulates a layer thickness of the toner supplied to the development roller 91.

The toner memory 95 constitutes a part of the memory and stores toner cartridge information. That is, the toner cartridge 9 includes the toner memory 95 as the memory for storing the toner cartridge information. The toner memory 95 is, for example, an IC chip. In a state where the toner cartridge 9 is attached to the apparatus main body 2, the controller 100 is electrically connected to the toner memory 95.

As shown in FIG. 3, the toner cartridge information stored in the toner memory 95 includes at least a number of toner printed sheets which is a cumulative number of printed sheets that have been printed by using the toner cartridge 9, a number of development rotations which is a cumulative number of rotations of the development roller 91, or a toner dot count which is a cumulative number of dots that have been printed by using the toner cartridge 9. In the present embodiment, the toner memory 95 stores specification information of the toner cartridge, the number of toner printed sheets, the number of development rotations, and the toner dot count.

The specification information of the toner cartridge is information relating to the specifications of the toner cartridge 9 such as a manufacturer and a toner capacity. In the present embodiment, the specification information of the toner cartridge 9 is a serial number of the toner cartridge 9, and the manufacturer and the toner capacity are specified from the serial number. The number of toner printed sheets is the cumulative number of printed sheets that have been printed by using the toner cartridge 9. The number of development rotations is the cumulative number of rotations of the development roller 91. The toner dot count is the cumulative number of dots that have been printed by using the toner cartridge 9.

In the present embodiment, a member for cleaning the circumferential surface of the photosensitive drum 81, which is different from the development roller 91 and the transfer roller 82, for example, a cleaning roller or a cleaning blade for cleaning the photosensitive drum 81 by contacting the photosensitive drum 81, is not provided. That is, in a case where foreign matter such as paper dust or residual toner adheres to the circumferential surface of the photosensitive drum 81, cleaning is performed by the development roller 91 or the transfer roller 82. In the present embodiment, in a case where foreign matter such as paper dust or residual toner adheres to the circumferential surface of the photosensitive drum 81, most of the foreign matter is removed by the development roller 91. As in the present embodiment, an image forming apparatus that does not include a member for cleaning the circumferential surface of the photosensitive drum 81, which is different from the development roller 91 and the transfer roller 82, may be referred to as a cleanerless-type image forming apparatus.

In the drum cartridge 8, the surface of the rotating photosensitive drum 81 is uniformly charged by the charger 83 and then exposed by high-speed scanning of a laser beam from the scanner unit 5. Thereby, the potential of the exposed portion is lowered, and an electrostatic latent image based on image data is formed on the surface of the photosensitive drum 81.

Next, the toner in the toner cartridge 9 is supplied to the electrostatic latent image on the photosensitive drum 81 by the development roller 91 which is rotationally driven, and a toner image is formed on the surface of the photosensitive drum 81. Thereafter, the sheet S is conveyed between the photosensitive drum 81 and the transfer roller 82, whereby the toner image borne on the surface of the photosensitive drum 81 is transferred onto the sheet S.

The fuser 7 includes a heating roller 71 and a pressure roller 72. The pressure roller 72 is arranged to face the heating roller 71. The pressure roller 72 presses the heating roller 71. The fuser 7 thermally fixes the toner transferred onto the sheet S while the sheet S passes between the heating roller 71 and the pressure roller 72.

The sheet S thermally fixed by the fuser 7 is conveyed to a sheet discharge roller 24 located on the downstream side of the fuser 7, and is sent out onto a sheet discharge tray 25 from the sheet discharge roller 24.

The controller 100 includes a CPU, a RAM, a ROM, a nonvolatile memory, an ASIC, an input-output circuit, and so on. The controller 100 performs control by performing various kinds of arithmetic processing based on a print command, a signal output from a sensor circuit board (not shown), and a program or data stored in the ROM and so on.

As shown in FIG. 4, the image forming apparatus 1 includes a temperature sensor 101, a humidity sensor 102, a sheet sensor 103, a charging bias applying circuit 104, a development bias applying circuit 105, and a transfer bias applying circuit 106.

The temperature sensor 101 is configured to detect a temperature of the image forming apparatus 1. The temperature detected by the temperature sensor 101 is sent to the controller 100. The humidity sensor 102 is configured to detect a humidity of the image forming apparatus 1. The humidity detected by the humidity sensor 102 is sent to the controller 100.

The sheet sensor 103 is located between the feeder unit 3 and the image forming unit 4 (see FIG. 1). The sheet sensor 103 is configured to detect the sheet S conveyed from the feeder unit 3. A signal indicating that the sheet sensor 103 detects the sheet S is sent to the controller 100.

The charging bias applying circuit 104 is a circuit that applies a voltage to the charging wire 831 and the grid electrode 832 of the charger 83. The development bias applying circuit 105 is a circuit that applies a bias to the development roller 91. The transfer bias applying circuit 106 is a circuit that applies a bias to the transfer roller 82. The charging bias applying circuit 104, the development bias applying circuit 105, and the transfer bias applying circuit 106 apply respective biases in response to signals from the controller 100.

When a print job is input, the controller 100 performs image formation in accordance with the input print job. Here, control performed by the controller 100 when performing image formation will be described.

When a print job is input, the controller 100 reads the drum cartridge information from the drum memory 85. When a print job is input, the controller 100 reads the toner cartridge information from the toner memory 95.

The controller 100 determines a rotation continuation time TC based on the drum cartridge information and the toner cartridge information. The rotation continuation time TC is a time (duration) of a rotation continuation operation for continuing rotations of the photosensitive drum 81 and the development roller 91 after an end of a print job. In the present embodiment, the controller 100 determines the rotation continuation time TC based on the number of drum printed sheets and the number of toner printed sheets.

Specifically, the rotation continuation time TC is determined as the sum of a first time T1 based on the specifications of the drum cartridge 8, a second time T2 based on the number of drum printed sheets, a third time T3 based on the specifications of the toner cartridge 9, and a fourth time T4 based on the number of toner printed sheets (TC=T1+T2+T3+T4).

The first time T1 is determined by the specifications of the drum cartridge 8. FIG. 7 includes an example of a table for calculating the first time T1. For example, in a case where the drum cartridge 8 is of specification A, that is, the manufacturer is Company X and the type is a standard life type, the first time T1 is 0 seconds. For example, in a case where the drum cartridge 8 is of specification B, that is, the manufacturer is Company Y and the type is a standard life type, the first time T1 is 0.1 seconds. For example, in a case where the drum cartridge 8 is of specification C, that is, the manufacturer is Company X and the type is a long life type, the first time T1 is 0.2 seconds. For example, in a case where the drum cartridge 8 is of specification D, that is, the manufacturer is Company Y and the type is a long life type, the first time T1 is 0.3 seconds.

The second time T2 is determined by the number of drum printed sheets. The second time T2 increases as the number of drum printed sheets increases. The second time T2 may be calculated by a calculation formula or may be determined by a table created in advance. In the case of calculation by the calculation formula, the second time T2 is calculated by multiplying a coefficient ($\alpha$) depending on the specifications of the drum cartridge 8 by the number of drum printed sheets (T2=$\alpha\times$the number of drum printed sheets). In the present embodiment, the second time T2 is determined by the table shown in FIG. 7.

The third time T3 is determined by the specifications of the toner cartridge 9. FIG. 7 includes an example of a table for calculating the third time T3. For example, in a case where the toner cartridge 9 is of specification A, that is, the manufacturer is Company P and the type is a standard capacity type, the third time T3 is 0 seconds. For example, in a case where the toner cartridge 9 is of specification B, that is, the manufacturer is Company Q and the type is a standard capacity type, the third time T3 is 0.2 seconds. For example, in a case where the toner cartridge 9 is of specification C, that is, the manufacturer is Company P and the type is a large capacity type, the third time T3 is 0.4 seconds. For example, in a case where the toner cartridge 9 is of specification D, that is, the manufacturer is Company Q and the type is a large capacity type, the third time T3 is 0.6 seconds.

The fourth time T4 is determined by the number of toner printed sheets. The fourth time T4 increases as the number of toner printed sheets increases. The fourth time T4 increases more than the second time T2 as the number of printed sheets increases. That is, the amount of increase of the fourth time T4 is greater than that of the second time T2. The fourth time T4 may be determined by a calculation formula or may be determined by a table created in advance. In the case of calculation by the calculation formula, the fourth time T4 is calculated by multiplying a coefficient (β) depending on the specifications of the toner cartridge 9 by the number of drum printed sheets (T4=β×the number of drum printed sheets). In the present embodiment, the fourth time T4 is determined by the table shown in FIG. 7.

As an example, in a case where the manufacturer of the drum cartridge 8 is Company Y and the drum cartridge 8 is of the standard life type, the manufacturer of the toner cartridge 9 is Company Q and the toner cartridge 9 is of the standard capacity type, the number of drum printed sheets is 5000 sheets, and the number of toner printed sheets is 2000 sheets, the rotation continuation time TC=0.1+1+0.2+1.4=2.7 seconds.

Figure 6:
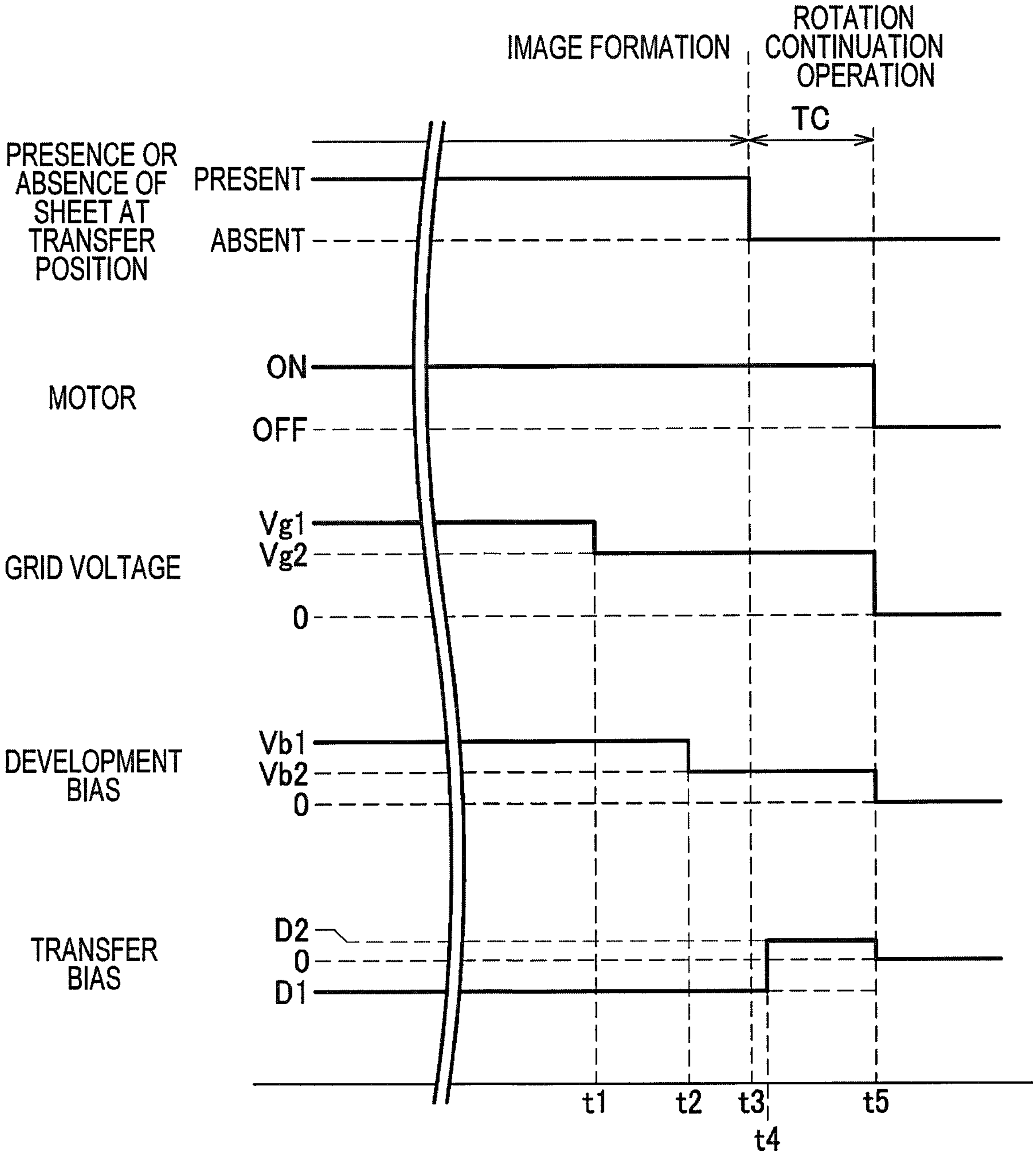
FIG. 6 is a time chart showing a rotation continuation operation performed by the controller.

After determining the rotation continuation time TC, the controller 100 controls the circuits 104, 105 and 106 to apply the charging bias, the development bias, and the transfer bias, rotates the photosensitive drum 81, the development roller 91, and the transfer roller 82, and performs image formation. At this time, the controller 100 applies a first charging bias Vg1 to the photosensitive drum 81 and applies a first development bias Vb1 to the development roller 91. Further, the controller 100 applies a first transfer bias D1 to the transfer roller 82 when performing image formation. The transfer bias is controlled to be a constant current. In FIG. 6, a case where a current flows from the photosensitive drum 81 to the transfer roller 82 is indicated by negative, and a case where a current flows from the transfer roller 82 to the photosensitive drum 81 is indicated by positive.

The controller 100 performs an update process of updating the drum cartridge information and the toner cartridge information stored in the drum memory 85 and the toner memory 95 in response to execution of image formation. The update process may be performed for each sheet or for each particular number of sheets.

The controller 100 performs the rotation continuation operation after the last sheet S on which an image is to be formed in the input print job passes the photosensitive drum 81 and until the rotation continuation time TC elapses. At this time, the controller 100 charges the photosensitive drum 81 with a second charging bias Vg2 smaller than the first charging bias Vg1, and applies a second development bias Vb2 smaller than the first development bias Vb1 to the development roller 91. The controller 100 applies a second transfer bias D2 to the transfer roller 82. The second transfer bias D2 has a smaller absolute value (magnitude) than the first transfer bias D1. In the present embodiment, the second transfer bias D2 has a polarity opposite to that of the first transfer bias D1. By setting the second transfer bias D2 to have a polarity opposite to that of the first transfer bias D1, the foreign matter on the photosensitive drum 81 does not move to the transfer roller 82, which reduces the foreign matter adhering to the back surface of the sheet S.

When the rotation continuation time TC has elapsed after the last sheet S passes the photosensitive drum 81, the controller 100 stops applying the charging bias, the development bias, and the transfer bias, and stops rotations of the photosensitive drum 81, the development roller 91, and the transfer roller 82.

Next, an example of processes performed by the controller 100 will be described with reference to the flowchart of FIG. 5 and the time chart of FIG. 6.

Figure 5:
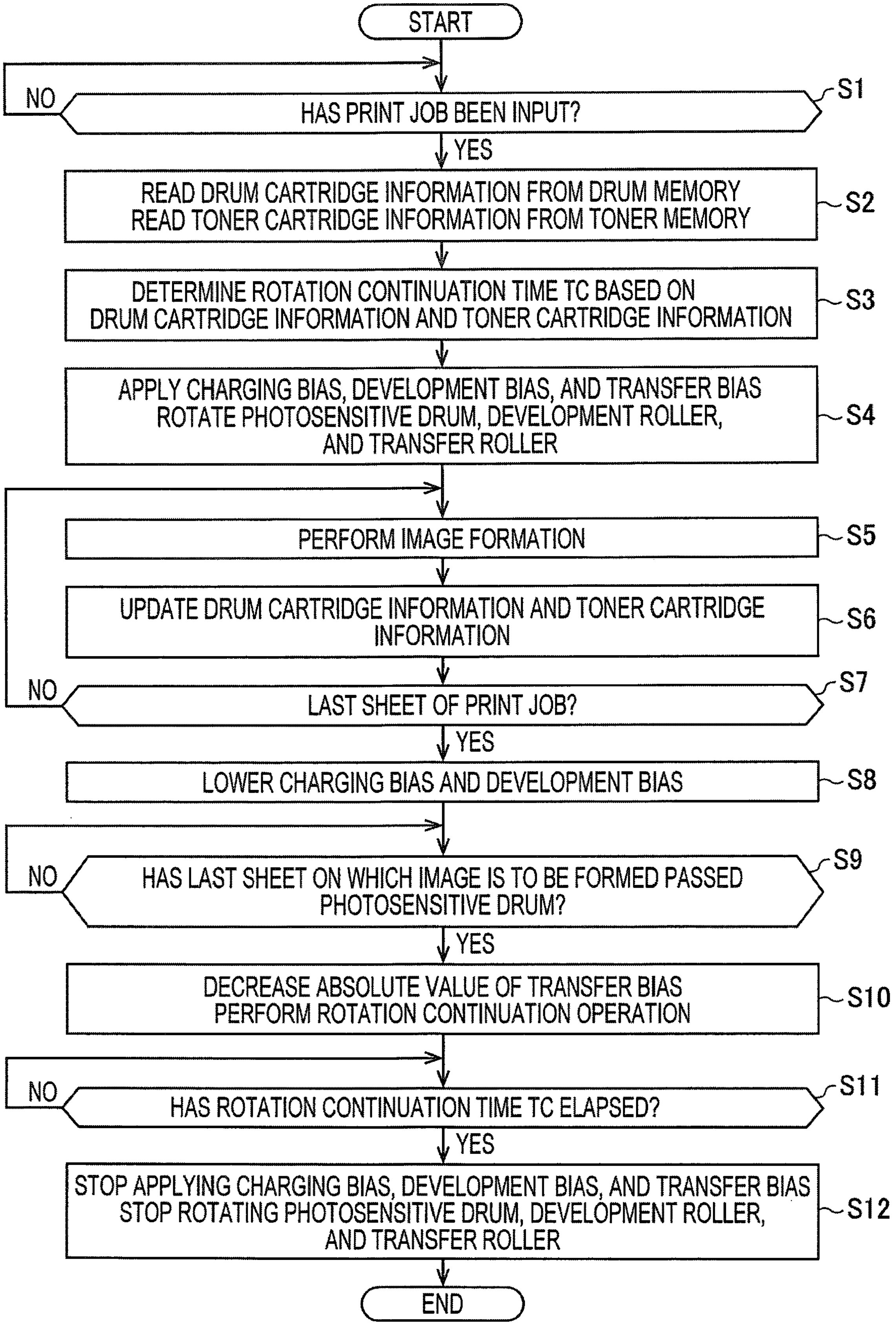
FIG. 5 is a flowchart showing processing of the controller when a print job is input.

As shown in FIG. 5, the controller 100 determines whether a print job has been input (S1). In step S1 (hereinafter, "step" will be abbreviated as "S"), in response to not determining that the print job is input (S1: No), the controller 100 waits until a print job is input.

In S1, in response to determining that a print job has been input (S1: Yes), the controller 100 reads the drum cartridge information from the drum memory 85 and reads the toner cartridge information from the toner memory 95 (S2).

After S2, the controller 100 determines the rotation continuation time TC based on the drum cartridge information and the toner cartridge information (S3).

After S3, the controller 100 controls the circuits 104, 105 and 106 to apply the charging bias, the development bias, and the transfer bias and controls the photosensitive drum 81, the development roller 91, and the transfer roller 82 to rotate (S4).

After S4, the controller 100 supplies the sheet S and performs image formation (S5).

After S5, the controller 100 updates the drum cartridge information and the toner cartridge information in accordance with the number of printed sheets, the number of rotations of the photosensitive drum 81, the number of rotations of the development roller 91, and the dot count, in association with execution of image formation (S6).

After S6, the controller 100 determines whether the sheet is the last sheet of the print job (S7).

In S7, in response to not determining that the sheet is the last sheet of the print job (S7: No), the controller 100 continues image formation for the next sheet (S5). In S7, in response to determining that the sheet is the last sheet of the print job (S7: Yes), the controller 100 lowers the charging bias (the grid voltage) and the development bias (S8). Specifically, as shown in FIG. 6, the controller 100 lowers the charging bias (the grid voltage) from Vg1 to Vg2 (time t1), and lowers the development bias from Vb1 to Vb2 (time t2). The controller 100 determines the timing of the time t1 and the time t2 by measuring the time from when a trailing edge of the last sheet of the print job passes the sheet sensor 103. The controller 100 measures time by a timer that is built in the controller 100.

After S8, the controller 100 determines whether the trailing edge of the last sheet S on which an image is to be formed has passed the photosensitive drum 81, and in response to determining that the trailing edge of the last sheet S on which an image is to be formed has passed the photosensitive drum 81 (S9: Yes), the controller 100 performs the rotation continuation operation (time t3). The controller 100 calculates a sheet conveyance amount from driving amounts of the rollers that convey the sheet S, and, based on the calculated sheet conveyance amount, determines that the trailing edge of the sheet S has passed the photosensitive drum 81. The controller 100 decreases the absolute value of the transfer bias immediately after the trailing edge of the last sheet S on which an image is to be formed passes the photosensitive drum 81 (S10, time t4). Specifically, the controller 100 changes the transfer bias from the first transfer bias D1 to the second transfer bias D2. The controller 100 determines the timing of the time t3 and the time t4 by measuring the time from when the trailing edge of the last sheet S of the print job passes the sheet sensor 103.

After S10, the controller 100 determines whether the rotation continuation time TC has elapsed from when the rotation continuation operation is started, that is, from when the trailing edge of the last sheet S on which image formation is to be performed passed the photosensitive drum 81 (S11). In response to determining that the rotation continuation time TC has elapsed from when the rotation continuation operation is started (S11: Yes), the controller 100 stops applying the charging bias, the development bias, and the transfer bias and stops rotations of the photosensitive drum 81, the development roller 91, and the transfer roller 82 (S12, time t5).

According to the image forming apparatus 1 described above, the following effects are obtained.

The controller 100 determines the rotation continuation time TC based on the drum cartridge information and the toner cartridge information, and performs the rotation continuation operation after image formation is finished. In the present embodiment, the controller 100 determines the rotation continuation time TC based on the number of drum printed sheets and the number of toner printed sheets. Thus, even if foreign matter adhering to the photosensitive drum 81 increases as the number of drum printed sheets increases, the rotation continuation time TC is increased in response to the increase of the foreign matter, and thus the foreign matter is appropriately removed. Further, even if the foreign matter adhering to the photosensitive drum 81 increases as the number of toner printed sheets increases, the rotation continuation time TC is increased in response to the increase of the foreign matter, and thus, the foreign matter is appropriately removed. If the removal of the foreign matter adhering to the photosensitive drum 81 is mainly considered, it is considered that the rotation continuation time TC may be set to be very long. However, if the rotation continuation time TC is set to be long, extra electric power is consumed and each member is deteriorated, and in this respect, it is desirable that the rotation continuation time TC is set to be shorter. According to the image forming apparatus 1 of the present embodiment, the foreign matter on the photosensitive drum 81 is appropriately removed based on the use state of the drum cartridge 8 and the toner cartridge 9.

The present embodiment relates to a so-called cleanerless-type image forming apparatus which does not include a member for cleaning the circumferential surface of the photosensitive drum 81, which is different from the development roller 91 and the transfer roller 82. Even with a configuration in which a member for cleaning the circumferential surface of the photosensitive drum 81 is not provided separately from the development roller 91 and the transfer roller 82, the image forming apparatus 1 appropriately removes the foreign matter on the photosensitive drum 81 by performing the rotation continuation operation.

When performing the rotation continuation operation, the controller 100 charges the photosensitive drum 81 with the second charging bias Vg2 which is smaller than the first charging bias Vg1, thereby reducing power consumption and suppressing deterioration of the charger 83.

When performing the rotation continuation operation, the controller 100 applies the second development bias Vb2 smaller than the first development bias Vb1 to the development roller 91, thereby reducing power consumption.

When performing the rotation continuation operation, the controller 100 applies the second transfer bias D2, which has a smaller absolute value than the first transfer bias D1, to the transfer roller 82, thereby reducing power consumption.

While the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the present disclosure, and not limiting the present disclosure. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described present disclosure are provided below.

In the above-described embodiment, the controller 100 determines the second time T2 and the fourth time T4 based on the number of drum printed sheets and the number of toner printed sheets. However, the controller 100 may determine the second time T2 and the fourth time T4 based on the number of drum rotations and the number of development rotations. The second time T2 increases as the number of drum rotations increases. The second time T2 may be calculated by a calculation formula or may be determined by a table created in advance. In a case where the second time T2 is calculated by the calculation formula, the second time T2 is calculated by multiplying a coefficient ($\gamma$) depending on the specifications of the drum cartridge 8 by the number of drum rotations (T2=$\gamma$×the number of drum rotations). Alternatively, the second time T2 may be determined by the table shown in FIG. 11A. The fourth time T4 increases as the number of development rotations increases. The fourth time T4 may be calculated by a calculation formula or may be determined by a table created in advance. In a case where the fourth time T4 is calculated by the calculation formula, the fourth time T4 is calculated by multiplying a coefficient ($\iota$) depending on the specifications of the toner cartridge 9 by the number of development rotations (T4=$\delta$×the number of development rotations). Alternatively, the fourth time T4 may be determined by the table shown in FIG. 11A.

In the above-described embodiment, the controller 100 determines the fourth time T4 based on the number of drum printed sheets and the number of toner printed sheets. However, the controller 100 may determine the fourth time T4 based on the toner dot count and on the number of drum printed sheets or the number of drum rotations. The fourth time T4 increases as the number of development rotations increases. The fourth time T4 may be calculated by a calculation formula or may be determined by a table created in advance. In a case where the fourth time T4 is calculated by the calculation formula, the fourth time T4 is calculated by multiplying a coefficient ($\theta$) depending on the specifications of the toner cartridge 9 by the toner dot count (T4=$\theta$×the toner dot count). The fourth time T4 may be determined by the table shown in FIG. 11B.

In the above-described embodiment, the controller 100 determines the rotation continuation time TC without considering an average dot occupancy in a printable range. However, in a case where the average dot occupancy in the printable range is less than a particular value, the controller 100 may set the rotation continuation time TC to be longer than a case where the average dot occupancy is greater than or equal to the particular value. Specifically, as an example, in a case where the average dot occupancy in the printable range is less than 5 percent (%), the controller 100 sets the rotation continuation time TC to be 1.5 times as long as the rotation continuation time TC in a case where the average dot occupancy is greater than or equal to 5 percent (%). In a case where the average dot occupancy is less than the particular value, the amount of external additive contained in the toner is also reduced, and thus the polishing force for removing foreign matter on the photosensitive drum 81 is reduced as compared with the case where the average dot occupancy is greater than or equal to the particular value. In order to compensate for this, the controller 100 increases the rotation continuation time TC to appropriately remove the foreign matter on the photosensitive drum 81.

In the above-described embodiment, the controller 100 does not change a speed difference between a rotation speed of the photosensitive drum 81 and a rotation speed of the development roller 91 between a case of performing image formation and a case of performing the rotation continuation operation. However, when performing the rotation continuation operation, the controller 100 may set the speed difference between the rotation speed of the photosensitive drum 81 and the rotation speed of the development roller 91 to be greater than the case of performing image formation. According to this configuration, when the rotation continuation operation is performed, the speed difference between the rotation speed of the photosensitive drum 81 and the rotation speed of the development roller 91 is increased, whereby more foreign matter on the photosensitive drum 81 is removed than a case where the speed difference is not increased.

Figure 8:
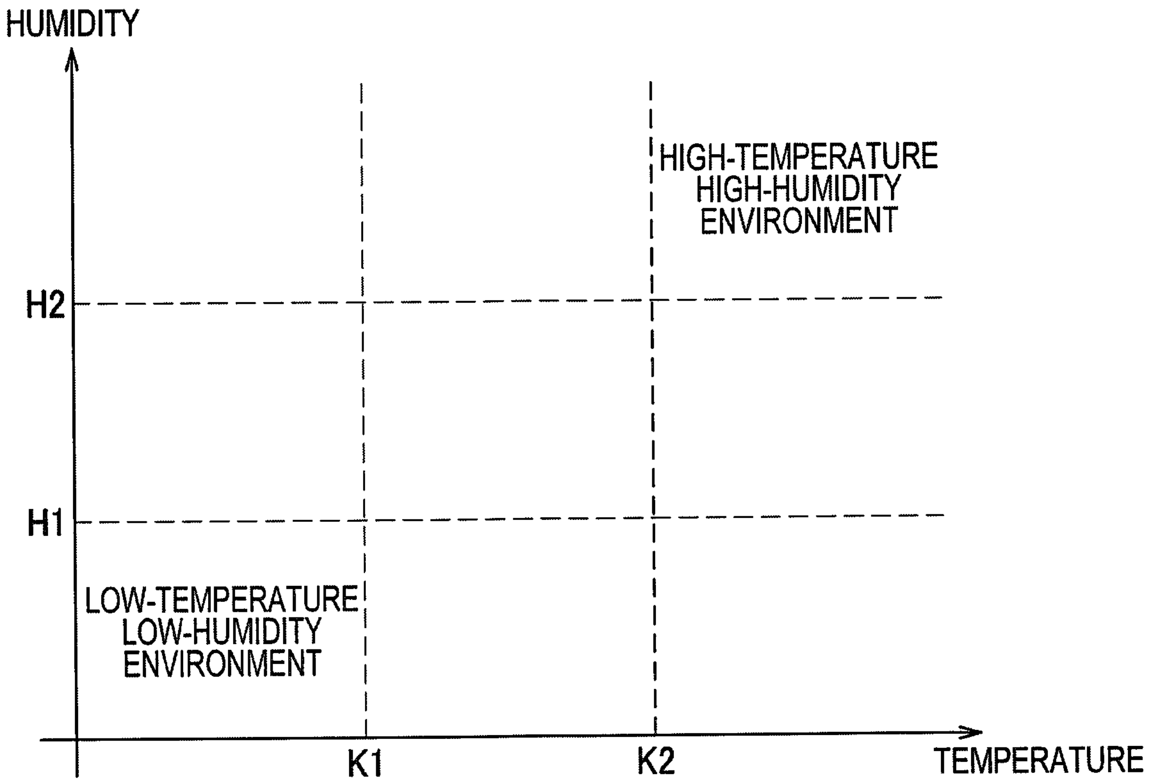
FIG. 8 is a diagram showing a criterion for the controller to determine whether an environment is in a standard environment or a non-standard environment.

In the above-described embodiment, the rotation continuation time TC is not changed even when the temperature detected by the temperature sensor 101 and the humidity detected by the humidity sensor 102 change. However, the controller 100 may determine that an environment in which the image forming apparatus 1 is installed is a non-standard environment that is not a standard environment based on the temperature detected by the temperature sensor 101 and the humidity detected by the humidity sensor 102, and may set the rotation continuation time TC to be longer in a case where the environment is the non-standard environment than a case where the environment is the standard environment. As shown in FIG. 8, the controller 100 determines that the environment is the non-standard environment which is not the standard environment in a case where the temperature is higher than a first threshold (temperature K2) and the humidity is higher than a second threshold (humidity H2) or in a case where the temperature is lower than a third threshold (temperature K1) and the humidity is lower than a fourth threshold (humidity H1). The third threshold (temperature K1) is lower than the first threshold (temperature K2). The fourth threshold (humidity H1) is lower than the second threshold (humidity H2). Specifically, in a case where the temperature is higher than or equal to K2 and the humidity is higher than or equal to H2, the controller 100 determines that the environment is a high-temperature and high-humidity environment (which is the non-standard environment), and sets the rotation continuation time TC to be twice as long as that in the case where the environment is the standard environment. For example, the thresholds may be set such that K2=25 degrees Celsius and H2=60 percent (%). Similarly, in a case where the temperature is lower than K1 and the humidity is lower than H1, the controller 100 determines that the environment is a low-temperature and low-humidity environment (which is the non-standard environment), and sets the rotation continuation time TC to be twice as long as that in the case where the environment is the standard environment. For example, the thresholds may be set such that K1=15 degrees Celsius and H1=30 percent (%). In the non-standard environment, the foreign matter on the photosensitive drum 81 is more difficult to remove than in the standard environment. By increasing the rotation continuation time TC, the foreign matter on the photosensitive drum 81 is appropriately removed.

Figure 9:
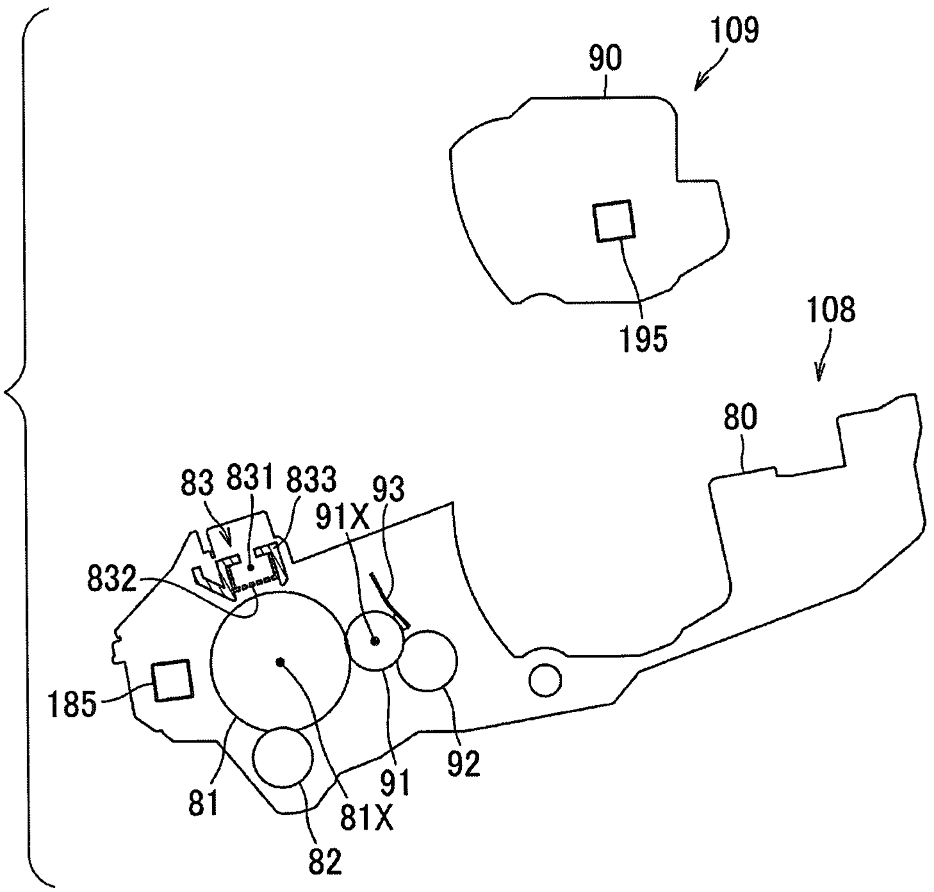
FIG. 9 is a cross-sectional view showing a drum cartridge and a toner cartridge.
Figure 10:
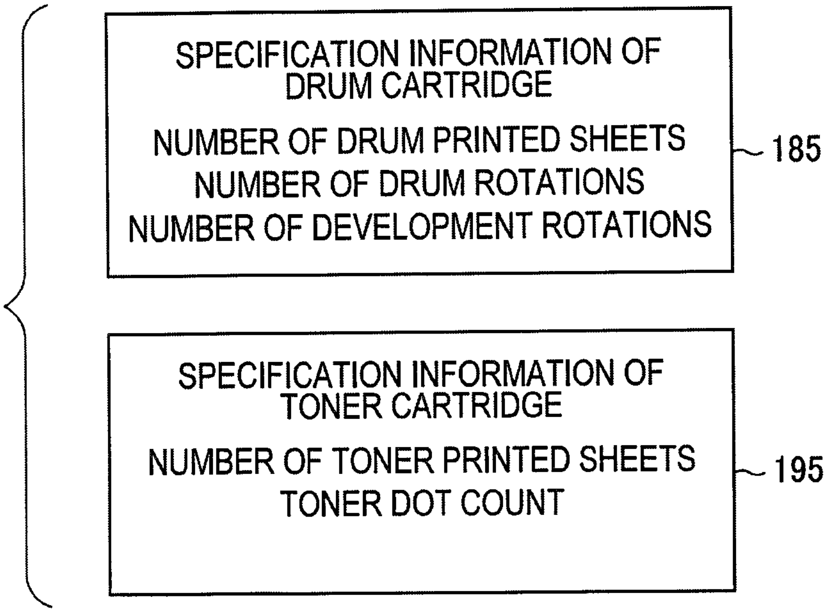
FIG. 10 is a diagram showing information stored in a drum memory and a toner memory.

In the above-described embodiment, the toner cartridge 9 includes the development roller 91. However, the drum cartridge may include the development roller. For example, a drum cartridge 108 shown in FIG. 9 includes the development roller 91, and a toner cartridge 109 does not include a development roller. In this case, as shown in FIG. 10, a drum memory 185 of the drum cartridge 108 stores, as the drum cartridge information, specification information of the drum cartridge, the number of drum printed sheets, the number of drum rotations, and the number of development rotations. A toner memory 195 stores, as the toner cartridge information, specification information of the toner cartridge, the number of toner printed sheets, and the toner dot count. In the modification shown in FIGS. 9 and 10, the controller 100 determines the rotation continuation time TC based on the drum cartridge information and the toner cartridge information, and performs the rotation continuation operation after a print job is finished. Thus, the foreign matter on the photosensitive drum 81 is appropriately removed in accordance with the use state of the drum cartridge 108 and the toner cartridge 109.

In the above-described embodiment, when the rotation continuation operation is performed, the grid voltage, the development bias, and the transfer bias are set to be smaller than those during image formation. However, the grid voltage, the development bias, and the transfer bias may be turned off during execution of the rotation continuation operation, so that the biases are not applied. By setting the biases to zero, power consumption is reduced.

In the above-described embodiment, the second transfer bias D2, which is the transfer bias in the case where the rotation continuation operation is performed, has the polarity opposite to that of the first transfer bias D1, but the polarity may not be opposite. Further, the polarity may not be opposite in the case of the high-temperature and high-humidity environment. In the high-temperature and high-humidity environment, the polarity of the toner tends to be reversed. Thus, by not setting the second transfer bias D2 to the opposite polarity, the foreign matter on the photosensitive drum 81 moving to the transfer roller 82 is reduced.

In the above-described embodiment, the drum cartridge includes the drum memory as the memory that stores the drum cartridge information. However, the drum cartridge may not include the drum memory. In a case where the drum cartridge does not have the drum memory, the drum cartridge information may be stored in a main body memory (not shown) of the image forming apparatus.

In the above-described embodiment, the toner cartridge includes the toner memory as the memory that stores the toner cartridge information. However, the toner cartridge may not include the toner memory. In a case where the toner cartridge does not include the toner memory, the toner cartridge information may be stored in a main body memory (not shown) of the image forming apparatus.

In the above-described embodiment, the toner cartridge 9 is attachable to and detachable from the apparatus main body 2 in a state where the toner cartridge 9 is attached to the drum cartridge 8. However, each of a toner cartridge and a drum cartridge may be attachable to an apparatus main body individually.

In the above-described embodiment, the image forming apparatus 1 is a monochrome laser printer, but the present disclosure is not limited to this. The image forming apparatus 1 may be applied to a color printer or other image forming apparatuses such as a copier or a multifunction peripheral.

The controller 100 may include a plurality of processors, and the plurality of processors may individually or collectively perform the steps described in FIG. 5. In this case, one of the plurality of processors may perform each of the described steps, or two or more of the plurality of processors may perform the described steps in a distributed manner.

The elements described in the above-described embodiment and modifications may be implemented in any combination.

What is claimed is:

1. An image forming apparatus comprising:

a drum cartridge including a photosensitive drum having a circumferential surface;

a toner cartridge including a toner housing configured to contain toner;

a development roller configured to contact the circumferential surface of the photosensitive drum, the development roller being configured to supply toner contained in the toner housing to the photosensitive drum and to remove foreign matter on the photosensitive drum;

a memory configured to store:

drum cartridge information including at least a number of drum printed sheets or a number of drum rotations, the number of drum printed sheets being a cumulative number of printed sheets that are printed by using the drum cartridge, the number of drum rotations being a cumulative number of rotations of the photosensitive drum; and toner cartridge information including at least a number of toner printed sheets, a number of development rotations, or a toner dot count, the number of toner printed sheets being a cumulative number of printed sheets that are printed by using the toner cartridge, the number of development rotations being a cumulative number of rotations of the development roller, the toner dot count being a cumulative number of dots that are printed by using the toner cartridge; and a controller configured to:

update the drum cartridge information and the toner cartridge information stored in the memory in association with execution of image formation; and perform a rotation continuation operation of continuing rotations of the photosensitive drum and the development roller until a rotation continuation time elapses after a last sheet on which image formation is to be performed in a print job passes the photosensitive drum, the rotation continuation time being determined based on the drum cartridge information and the toner cartridge information.

2. The image forming apparatus according to claim 1, further comprising a transfer roller configured to transfer a toner image formed on the photosensitive drum to a sheet, wherein the development roller and the transfer roller are configured to perform cleaning of the circumferential surface of the photosensitive drum, without a cleaning member separate from the development roller and the transfer roller being provided.

3. The image forming apparatus according to claim 1, wherein the controller is configured to determine the rotation continuation time based on the number of drum printed sheets and the number of toner printed sheets.

4. The image forming apparatus according to claim 1, wherein the toner cartridge includes the development roller; and wherein the controller is configured to determine the rotation continuation time based on the number of drum rotations and the number of development rotations.

5. The image forming apparatus according to claim 1, wherein the controller is configured to determine the rotation continuation time based on the toner dot count and on the number of drum printed sheets or the number of drum rotations.

6. The image forming apparatus according to claim 1, wherein the controller is configured to:

in a case where an average dot occupancy in a printable range is less than a particular value, set the rotation continuation time to a longer time than a case where the average dot occupancy is greater than or equal to the particular value.

7. The image forming apparatus according to claim 1, wherein the controller is configured to:

when performing image formation, charge the photosensitive drum with a first charging bias; and when performing the rotation continuation operation, charge the photosensitive drum with a second charging bias smaller than the first charging bias.

8. The image forming apparatus according to claim 1, wherein the controller is configured to:

when performing image formation, apply a first development bias to the development roller; and when performing the rotation continuation operation, apply a second development bias smaller than the first development bias to the development roller.

9. The image forming apparatus according to claim 1, wherein the controller is configured to:

when performing the rotation continuation operation, set a speed difference between a rotation speed of the photosensitive drum and a rotation speed of the development roller to a greater value than when performing image formation.

10. The image forming apparatus according to claim 1, further comprising a transfer roller configured to transfer a toner image formed on the photosensitive drum to a sheet, wherein the controller is configured to:

when performing image formation, apply a first transfer bias to the transfer roller; and when performing the rotation continuation operation, apply a second transfer bias to the transfer roller, the second transfer bias having a smaller absolute value than the first transfer bias.

11. The image forming apparatus according to claim 1, further comprising a temperature sensor and a humidity sensor, wherein the controller is configured to:

in a case where a temperature detected by the temperature sensor is higher than a first threshold and a humidity detected by the humidity sensor is higher than a second threshold, or in a case where the temperature is lower than a third threshold and the humidity is lower than a fourth threshold, determine that an environment of the image forming apparatus is a non-standard environment that is not a standard environment, the third threshold being lower than the first threshold, the fourth threshold being lower than the second threshold; and in a case where the environment is the non-standard environment, set the rotation continuation time to a longer time than a case where the environment is the standard environment.

12. The image forming apparatus according to claim 1, wherein the toner cartridge includes a toner memory as the memory configured to store the toner cartridge information.

13. The image forming apparatus according to claim 12, wherein the drum cartridge includes a drum memory as the memory configured to store the drum cartridge information.

14. The image forming apparatus according to claim 1, further comprising an apparatus main body, wherein the drum cartridge and the toner cartridge are attachable to and detachable from the apparatus main body; and wherein the toner cartridge includes the development roller.

15. The image forming apparatus according to claim 1, further comprising an apparatus main body, wherein the drum cartridge and the toner cartridge are attachable to and detachable from the apparatus main body; and wherein the drum cartridge includes the development roller.

16. The image forming apparatus according to claim 1, wherein the controller is configured to:

in a case where the drum cartridge is of a long life type, set the rotation continuation time to a longer time than a case where the drum cartridge is of a standard life type.

17. The image forming apparatus according to claim 1, wherein the controller is configured to:

in a case where the toner cartridge is of a large capacity type, set the rotation continuation time to a longer time than a case where the toner cartridge is of a standard capacity type.

18. The image forming apparatus according to claim 10, wherein the second transfer bias has a polarity opposite to a polarity of the first transfer bias.

19. The image forming apparatus according to claim 1, wherein the controller is configured to:

read the drum cartridge information and the toner cartridge information from the memory in response to input of the print job;

determine the rotation continuation time based on the drum cartridge information and the toner cartridge information read from the memory; and perform image formation after determining the rotation continuation time.

* * * * *